United States Patent [19]

Borup et al.

[11] Patent Number: 4,520,901
[45] Date of Patent: Jun. 4, 1985

[54] METHOD AND APPARATUS FOR DISPENSING A WORKING SUBSTANCE SUCH AS A LUBRICANT

[75] Inventors: Alf L. Borup, Bromma; Erik G. Åström, Järfälla, both of Sweden

[73] Assignee: Swedish Rail System AB SRS, Solna, Sweden

[21] Appl. No.: 946,923

[22] Filed: Sep. 28, 1978

[30] Foreign Application Priority Data

Sep. 30, 1977 [SE] Sweden .................................. 7710965
Jul. 20, 1978 [SE] Sweden .................................. 7808021

[51] Int. Cl.³ .......................... B61F 17/00; F16N 7/00
[52] U.S. Cl. ..................................... 184/3.1; 184/15.3
[58] Field of Search ................... 184/3 A, 3 R, 15 B, 184/54

[56] References Cited

U.S. PATENT DOCUMENTS

| | | | |
|---|---|---|---|
| 2,104,176 | 1/1938 | Warr | 184/3.1 |
| 2,285,082 | 6/1942 | Bolt | 184/3.1 |
| 2,718,280 | 9/1955 | Hurrell | 184/3.1 |
| 2,814,422 | 11/1957 | Mercier | 184/3.1 |
| 3,051,262 | 8/1962 | Bettison | 184/3.1 |
| 3,059,724 | 10/1962 | Soule | 184/3.1 |

FOREIGN PATENT DOCUMENTS 1246794 8/1967 Fed. Rep. of Germany .

*Primary Examiner*—David H. Brown
*Attorney, Agent, or Firm*—Sughrue, Mion, Zinn, Macpeak, and Seas

[57] ABSTRACT

In a method of lubricating a curved section of a railway track subjected to wear by the wheel-flanges of passing railroad vehicles the rail section is intermittently lubricated with lubricant from a lubricating shot-unit or metering-unit provided with a nozzle. The shots of lubricant may be controlled by using a signal voltage applied between the rails or by means of an electric transducer, an inductive transducer, a coupling clock or the like. Compressed air and/or lubricant is applied through lines to the metering-unit from separate storage containers arranged at a distance from the unit.

In one embodiment a propelling-gas of reduced pressure is caused, via a control unit, to control in a pulse-like fashion a metering valve associated with said metering-unit.

The invention also refers to an apparatus for the intermittent discharge of a working substance, e.g. grease for lubricating railway tracks, by means of a propelling-gas under high pressure such as nitrogen gas.

15 Claims, 4 Drawing Figures

METHOD AND APPARATUS FOR DISPENSING A WORKING SUBSTANCE SUCH AS A LUBRICANT

The present invention relates to a method for dispensing a working substance such as grease for instance for lubricating a curved section of railway line subjected to wear by the wheel-flanges of a passing railroad vehicle.

Lubricating apparatus used hitherto include piston pumps arranged on the outside of the rail, these pumps being actuated by the wheels of a passing railroad vehicle in a manner such that lubricating grease is pumped to the head of the rail through holes located in a slotted steel straight-edge mounted on said rail head. The apparatus, together with a grease container, is mounted in the outer rail by means of a bolt joint in the web of the rail, it being necessary to drill two holes in the rail for each said apparatus.

This construction is totally unsatisfactory in view of the speeds of present day trains, the length of such trains and the density of traffic. Thus, the apparatus must be serviced and repaired at close intervals, requiring a large number of personel for maintaining the apparatus in operation. The piston pumps—two for each apparatus—are particularly subjected to wear, and the aforementioned straight-edge is worn with contact with the wheel-flanges. Snow, ice and sub-zero temperatures render it practically impossible to maintain the apparatus in operation during the winter time, and hence, in a number of places, the apparatus are removed during this time of the year.

As before mentioned, when mounting the apparatus in position it is necessary to drill holes in the rail, which weakens the rail, with the subsequent risk of metal fatigue.

The positioning of the apparatus between the sleepers of a track also makes it necessary to remove the apparatus when carrying out track-aligning work. Furthermore, certain types of snow-removing machines cannot be moved past the apparatus, whilst removing snow from the tracks.

The quantity of lubricant used by the apparatus is often so large that the apparatus must be refilled every two or three weeks. Since the grease normally used is a graphite grease, the work is dirty and is considered by many to constitute an environmental problem. The amount of grease consumed is difficult to control. Hence wastage is high and dirtying of the track troublesome.

The object of the present invention is to provide a method and apparatus with which the aforementioned disadvantages are circumvented.

The method according to the invention is characterised mainly by the fact that the curved-section of the track—in the case of double tracks one or two locations at the entrance to the curve—is intermittently supplied with lubricant from a shot- or metering-unit provided with a nozzle and located at a distance from said rail section or wheel flange.

Because the metering-unit is remote from the rail and because one or a limited number of shots of lubricant are dispensed the wear on the unit will be restricted to a minimum, whilst effectively lubricating the rail without unnecessary waste. No work need be carried out on the rails or the rail fittings and track-aligning machines are able to work without it being necessary to remove or dismantle the metering-unit. Neither need the metering apparatus present an obstacle to snow-removing machines, which means that the metering apparatus need not be dismantled during the winter time. Conveniently, the pressure in the metering-unit is adjusted to a magnitude such that the presence of ice and snow will not prevent the grease from carrying to the rail being lubricated. When the metering-unit is mounted on a rail sleeper, the shot of lubricant is projected through such obstacles.

It is preferred in practice to dispense the lubricant immediately before the passage of a train on the section of rail in question. The shot of lubricant can, in this way, be controlled by using a signal voltage present between the rails. In practice this is achieved by the fact that as a train approaches on the signal path where the metering-unit is placed, the electric voltage between the rails drops. This activates a valve which sends a signal to the apparatus to dispense a shot of lubricant to the rail head of the rail.

The majority of major railway tracks in Sweden, and also in most other countries, normally have a signal voltage between the rails. If this is not the case, the metering-unit can be controlled by means of an electric transducer, such as a photocell, an inductive transducer, a coupling clock etc. These require so little energy that batteries having many months of useful life can be used. The use of solar cells is also conceivable.

When the metering-unit is, instead, mounted on a train, preferably a unit directed towards a wheel-flange on both sides of the train, the shot of lubricant onto respective wheel-flanges can be controlled by means of a pulse unit arranged on the train, said pulse unit being manually actuated by an acceleration transducer for lateral sensing, or a level sensor which detects the inclination of the train as a result of passing a raised section of rail in the curved section thereof.

It is preferred that the lubricant is dispensed by means of compressed air.

Propelling-gas and lubricant can be passed to the metering-unit, via lines, from separate, replenishable storage containers arranged at a distance from said unit.

In this way the containers with lubricant and propelling-gas need only be filled at long intervals, for example twice per year.

These storage containers are conveniently placed adjacent the rail in a manner such as to permit comfortable access thereto from a service carriage movable on said rails. In this respect there can be used a railroad trolley equipped with compressor, compressed-air driven high-pressure pump for filling air-bottles and a compressed-air driven pump for filling the lubricant containers from a large container. Such a service trolley shall be able to serve a district of the railroad with a large number of lubricating apparatus. Refilling of the apparatus may be effected via quick-couplings, so that the operator need not come into contact with the lubricant.

When lubricating curved rail sections associated with switches, for example sidings, switch yards etc., a multiplicity of metering-units can be connected to a central lubricant container and associated pump. In this way refilling of the lubricant container can be greatly simplified.

In one embodiment wherein the lubricant is supplied to the metering-unit from a high-pressure container provided with an outlet by use of a propelling-gas under high pressure, e.g. nitrogen gas, the propelling-gas of reduced pressure is caused, via a control unit, to control in a pulse-like fashion a metering valve associated with said metering-unit, said metering valve causing the intermittent discharge of said lubricant.

Then no pump or other similar movable component is required for supplying the lubricant, thereby eliminating the aforementioned problems.

The propelling-gas chosen in each individual case shall be one which does not have a harmful effect on the lubricant. An inert gas such as nitrogen is often to be preferred. Nitrogen is also an advantageous choice from an economic point of view, since pressurized nitrogen is available at comparatively low costs. The propelling-gas, however, may also be compressed-air when the properties of the working substance, the climatic conditions, the safety requirements etc., permit.

The Swedish Patent Specification Nos. 164,390, 165,860; 92,019; the Swiss Patent Specification No. 406,283; the U.S. Pat. Nos. 3,760,904, 636,185, 696,197; and the British Patent Specification No. 1,436,282, all describe methods and apparatus for dispensing various types of working substances from containers with the use of air. None of these earlier publications, however, teach the intermittent discharge of a working substance under high pressure in the form of a brief jet or shot.

In practice, the pressure of the propelling-gas can be reduced in a pressure regulator having a high-pressure outlet and a low-pressure outlet, the low-pressure outlet being connected to the control unit.

The pressure in the high-pressure outlet of the pressure regulator may be of the order of magnitude of 50 bars, whilst the pressure in the low-pressure outlet may be approximately 6 bars.

The invention also relates to an apparatus for the intermittent discharge of a working substance, e.g. grease, for lubricating railway lines by means of a propelling-gas under high pressure, the main characterising features of said apparatus being disclosed in the claims. When an apparatus of the kind in question is used for metering lubricant to railway lines, it can be constructed in different ways, for example it can be arranged in a cabinet placed adjacent the track on one side thereof or in a housing placed in the track. In both cases, the apparatus can be readily filled with propelling-gas, in this case nitrogen, and working substance, i.e. grease, by means, for example, of a service carriage or trolley arranged for movement along the track and having corresponding supply containers capable of being connected to the drive-gas container and storage container respectively through quick couplings. Alternatively, respective empty containers can be exchanged for full ones, either singly or both together.

In practice, the magnet valve of the apparatus can be controlled by an electronic unit which can be constructed in alternative manners. For example, it can be constructed for coupling to a signal line present on the track, so that it is completely self-efficient and requires no maintenance. Immediately before a train passes, the magnet valve is actuated as a result of a drop in voltage on the signal line, whereupon a propelling-gas pulse activates the metering valve of the metering-unit in a manner such as to release a shot of grease.

Alternatively, the magnet valve can be actuated by means of an electronic time-interval clock with adjustable intervals, which clock is chargeable or is provided with a one-time accumulator sufficient for several months operating time, depending upon the density of the rail traffic. Inductive transducers or other types of transducers can also be used for controlling the magnet valve.

The invention will now be described in more detail with reference to two embodiments thereof illustrated in the accompanying schematic drawings.

Figure 1:
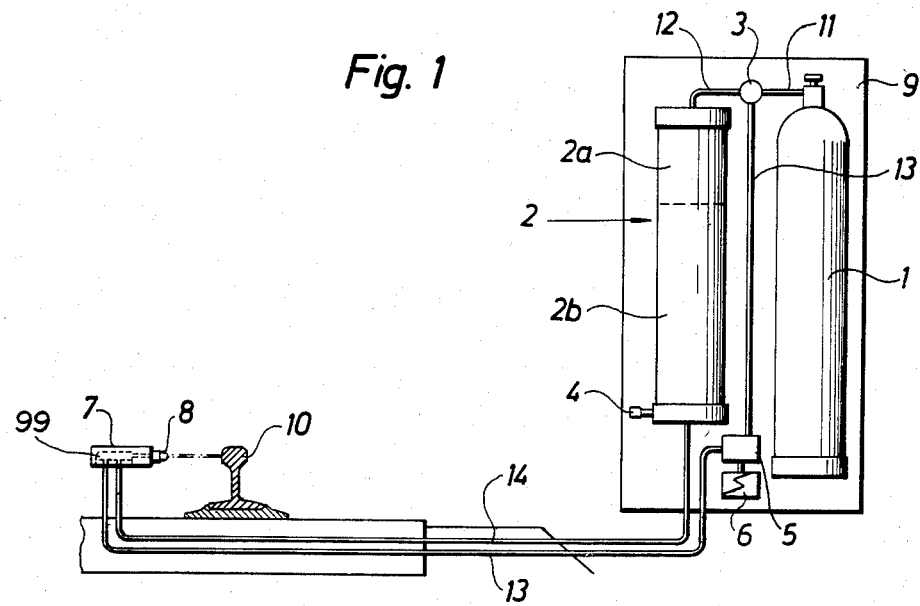
FIG. 1 is a front view of a first embodiment of an apparatus according to the invention with a cabinet housing the apparatus placed on one side of a railway track.

The reference 10 in FIG. 1 identifies a rail forming part of a curved section of railway track, which rail requires intermittent lubrication because of wear caused by the wheel-flanges of a train passing thereon. This lubrication is carried out by means of a metering- or shot-unit 7 placed at a distance from the rail 10, said metering-unit squirting lubricant onto the rail through a nozzle 8.

The metering-unit 7 is fed with grease from a grease container 2 placed on one side of the rail, a propelling-gas, suitably nitrogen, being supplied to the upper end of said container from a propelling-gas container 1 at a pressure of approximately 50 bars.

To this end, the propelling-gas container 1 is provided with an outlet line 11 which is connected to a pressure regulator 3 having two outlets, namely a high-pressure line 12 leading to the grease container 2 and a low-pressure line 13 which is connected to a magnet valve 5, said valve being actuable by an electronic unit 6. The low-pressure line 13 extends from the magnet valve 5 to the metering-unit 7 where it is adapted to transmit an impulse effect against the metering valve 99 of the latter.

The high-pressure line 12 is connected to the inlet side of the pressure container 2, propelling-gas 2a being located at said inlet side. The lower part of the container 2 is referenced 2b in FIG. 1, grease being contained in said lower part. The grease section 2b of the container 2 communicates with the metering-unit 7 through a supply line 14. The reference 4 identifies a quick coupling for attaching a grease-replenishing hose for example. The two components 1 and 2 are mounted in a cabinet 9 placed to one side of the railway track in a position in which the two containers can readily be reached from a service carriage.

To improve the effect of the lubricating apparatus, the shot-nozzle of the metering-unit can be constructed in a manner such that a two-part shot of lubricant is projected onto the rail 10.

Figure 2:
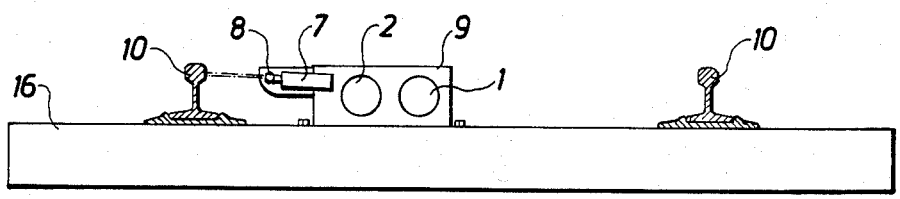
FIG. 2 is a front view of an alternative embodiment with the actual apparatus arranged in the track.
Figure 3:
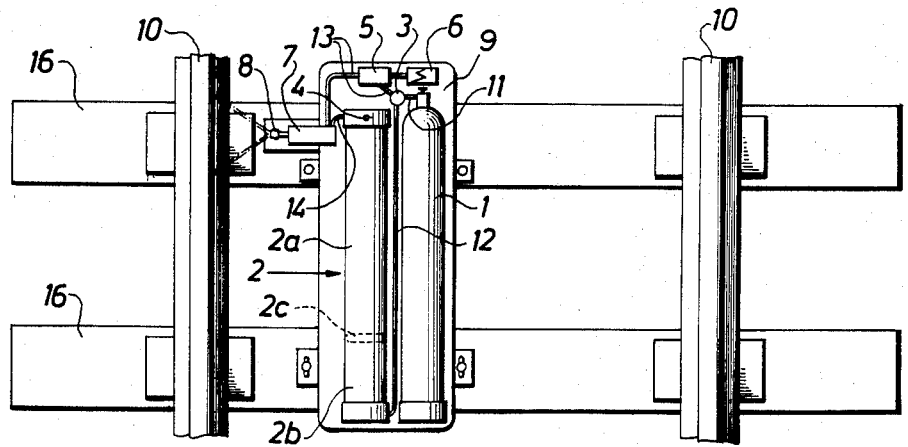
FIG. 3 is a plan view of the apparatus shown in FIG. 2.
Figure 4:
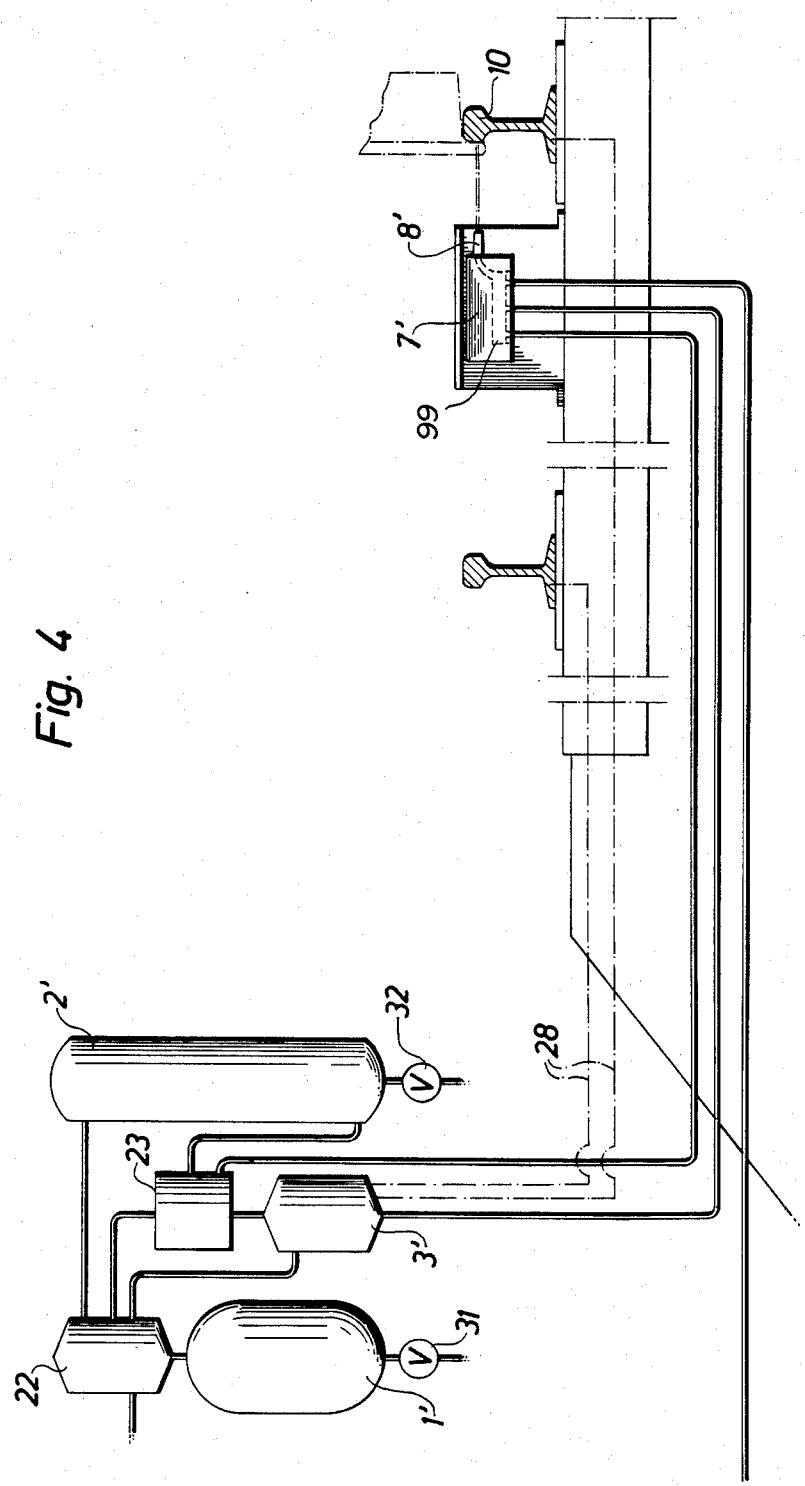
FIG. 4 is a front view which illustrates a somewhat modified embodiment.

In the modified embodiment illustrated in FIGS. 2 and 3, corresponding elements have been given the same references. The cabinet 9 accommodating the two containers 1 and 2 is, in this embodiment, positioned in a manner such that the containers occupy a horizontal position in the space between the two rails 10 of a track. The nozzle 8 of the metering-unit 7 is directed towards the outer rail 10 in a curve section of track. As will be seen from FIG. 3, the cabinet 9 rests against two mutually adjacent sleepers 16 in the track.

In this embodiment, the supply lines extending between the two containers 1 and 2 and the metering-unit 7 are of substantially shorter length than the supply lines of the FIG. 1 embodiment, and hence the pressure drop in these lines is smaller. The apparatus can therefore be expected to operate with greater reliability than the apparatus illustrated in FIG. 1. The function of the two types of apparatus, however, is substantially the same.

In the FIG. 3 embodiment, a free piston 2c is arranged between the gas-section 2a of the grease container 2 and the grease-section 2b. The object of this piston is to hold the gas-section and the grease-section separated from each other when the containers are placed in a lying position. Alternatively, a rubber diaphragm or the like can be used.

A modified apparatus comprises a shot-unit or metering-unit 7' for dispensing a lubricating grease, said unit 7' being mounted on a sleeper between two rails and being located at a distance from the inner rail head of the outer rail portion, and being provided with a nozzle 8' directed towards said rail head. The metering unit 7' is not in mechanical contact with the rail head and is arranged to dispense a metered quantity of lubricant to the rail head immediately prior to a train or other railroad vehicle passing the track section served by said unit 7'.

Arranged on the side of the rail is further apparatus associated with said lubricant-dispensing apparatus, said further apparatus comprising, for example, an air container or compressed air-bottle 1', an air-control unit 22 and a pump unit 23. These two latter units are connected to a storage container 2' for lubricating-grease, and the pump unit 23 and a control unit 3' are connected to the metering-unit 7'. The control unit is arranged to sense, through an electric line 28, a signal voltage applied to the rail section in question. When a train passes, the voltage drops and this drop is sensed by the control unit, which then sends a pulse for releasing a shot of lubricant from the metering-unit 7' to the rail head of the rail 10. The quantity of lubricant thus ejected is then spread by the wheel-flanges of the passing railroad vehicle engaging the rail head.

The air container 1' and the lubricant container 2' are provided with connection nipples 31 and 32 located at a suitable height to enable them to be readily reached from a service trolley or carriage on the track.

Instead of utilising a signal voltage applied on the rail to provide a pulse to the metering-unit, the metering-unit can be controlled in other suitable ways, for example by means of different types of electrical transducers, such as e.g. photocells or inductive transducer. Optionally there can also be used a coupling clock arranged to emit a signal at suitable intervals, for example at a given number of times per day.

The quantity of lubricant dispensed from the metering-unit can be variably adjusted by means of a screw control means (not shown) arranged on said unit.

For the purpose of lubricating the switches of a siding or shunting yard for example, each of the switches may be provided with a metering-unit 7', 8'. Compressed air and lubricant are supplied to each said unit from a centrally arranged storage container 1' and 2', respectively.

In a further embodiment, which affords a number of advantages in practice, there is used a two or three part nozzle on the metering-unit. In this way it is possible to dispense two or three times as much lubricant to the inclined rail head.

An important advantage afforded by the invention is that the metering-unit can be placed at any location which is deemed to be the most suitable in the case in question, adjacent a curve or a switch. In the case of a single track, the metering-unit can be placed approximately centrally of the curve, whilst in the case of a double track, a metering-unit can be placed at the entrance to respective curves.

It has been established that when lubricating the rail head of the outer rail in a curve having a radius less than 600 m, there is a reduction in wear of approximately 50%, with respect to the lateral wear on the rails.

The considerably longer intervals between the occasions when it is necessary to service the unit and to replenish the containers, and the simplification of this work afforded by the invention, results in a considerable saving of personnel. For the same reason the apparatus will remain operative for a longer period of time each year than will previously known apparatus of this type.

An apparatus constructed in accordance with the invention can be used for purposes other than that described above in which a working substance is to be discharged intermittently by means of a propelling-gas under high pressure, and when it is desirable, or a requirement, to avoid the use of pumps or similar moving elements to the greatest possible extent. For example, this is the case when there is the risk of a working substance being contaminated or changed during passage through a pump or a corresponding device, or alternatively when the working substance itself creates a contaminating atmosphere. Thus, the invention can be successfully applied within the foodstuff industry, the medicine industry and packaging industry. Furthermore, the invention can be utilised in different types of control and regulating systems, e.g. in reserve plants, on ships, aircraft, in hospitals and within industry etc., in those cases when a desired step is to be carried out quickly and reliably, particularly if normal systems become inoperative. The simple design of the system and its lack of moveable elements affords particular advantage in such cases. A further advantage with an apparatus constructed in accordance with the invention is that it is substantially silent in operation.

We claim:

1. A method of lubricating with grease a curved section of a railway track subjecting to wear by the wheel flanges of passing railway vehicles, comprising:
providing a lubricating metering unit at a distance from but adjacent to the inner side surface of a rail section to be lubricated; and, intermittently propelling a metered amount of grease from a generally horizontally directed nozzle of said metering unit in a shot-like fashion to the inner side surface of the rail section.

2. A method according to claim 1, characterised by controlling the shot of lubricant by using a signal voltage applied between the rails.

3. A method according to claim 1, characterised by controlling the shot of lubricant by means of an electric transducer, an inductive transducer, a coupling clock or the like.

4. A method according to claim 1, characterised by supplying gas under pressure and said grease through lines to said metering-unit from separate, replenishable storage containers.

5. The method of claim 1 further comprising the steps of supplying gas under pressure to a high pressure grease container to result in grease under pressure at an outlet of said grease container, and supplying said grease under pressure from said outlet to said metering unit.

6. The method of claim 5 further comprising the steps of supplying gas under reduced pressure and under control of a control unit to said metering unit to control the shot-like dispensing of grease from said metering unit.

7. The method of claim 6 further comprising the step of providing a high pressure container of gas and connecting said container to a pressure regulator to supply said gaas under pressure and said gas under reduced pressure.

8. The method according to any of claims 5, 6, or 7 wherein said gas is nitrogen.

9. Apparatus for the shot-like dispensing of metered amounts of grease generally horizontally onto the inner side surface of a railway track at a curved section of said track, said apparatus being adapted to be located adjacent to said curved section of track, comprising,
- a first container for storing grease to lubricate said curved section of said track,
- a second container for supplying gas under pressure,
- a metering unit, having a generally horizontally directed nozzle, and being responsive to a gas under pressure being applied thereto, for dispensing via said nozzle in shot-like fashion a metered amount of grease supplied thereto under pressure,
- means connecting said gas from said second container to said metering unit to control the shot-like dispensing of said grease, and
- means responsive to said gas under pressure for supplying said grease under pressure to said metering unit.

10. Apparatus as claimed in claim 9 wherein said means for supplying said grease under pressure comprises, a pressure regulator having an inlet and a high pressure outlet, said inlet being connected to said second container and said outlet being connected to said first container, said second container also being connected to supply said grease under pressure to said metering unit.

11. Apparatus as claimed in claim 10 wherein said pressure regulator has a low pressure outlet for supplying gas under pressure but at a lower pressure than appearing at its inlet and at its high pressure outlet, and wherein said means connecting said gas to said metering unit comprises a means for connecting the low pressure gas at said low pressure outlet to said metering unit.

12. An apparatus according to claim 11, characterized in that the low-pressure outlet is connected to the metering-unit through a line and a magnet valve arranged to be actuated by an electronic unit.

13. An apparatus according to claim 11, characterised in that said first and second containers are arranged in a horizontal position in the track.

14. An apparatus according to claim 11, characterized in that said first and second containers are positioned adjacent the rail such that they can be readily reached from a service trolley movable on said rail.

15. The apparatus as claimed in any of claims 9, 10, 11, 14, 12, or 13 wherein said gas under pressure is nitrogen.

* * * * *